(12) United States Patent
Mikula

(10) Patent No.: US 9,021,943 B2
(45) Date of Patent: May 5, 2015

(54) DEVICE AND METHOD TO SIMULATE COOKING STUFFING IN A BIRD

(71) Applicant: Kristy R. Mikula, Monaca, PA (US)

(72) Inventor: Kristy R. Mikula, Monaca, PA (US)

(*) Notice: Subject to any disclaimer, the term of this patent is extended or adjusted under 35 U.S.C. 154(b) by 0 days.

(21) Appl. No.: 14/262,949

(22) Filed: Apr. 28, 2014

(65) Prior Publication Data

US 2014/0230664 A1   Aug. 21, 2014

Related U.S. Application Data

(62) Division of application No. 13/595,040, filed on Aug. 27, 2012, now Pat. No. 8,741,374.

(51) Int. Cl.
*A47J 27/04* (2006.01)
*A23L 1/315* (2006.01)

(52) U.S. Cl.
CPC ............ *A47J 27/04* (2013.01); *A47J 2027/043* (2013.01); *A23L 1/3157* (2013.01)

(58) Field of Classification Search
CPC ......... A47J 27/04; A23L 1/3157; A23L 1/315

USPC ................. 426/644, 241–243, 510–513, 523; 99/345, 426, 441.467, 473
See application file for complete search history.

(56) References Cited

U.S. PATENT DOCUMENTS

| | | | | |
|---|---|---|---|---|
| 1,403,045 | A * | 1/1922 | McHugh | 99/426 |
| 1,460,248 | A * | 6/1923 | Kott | 99/427 |
| 3,708,312 | A * | 1/1973 | Malinow | 26/87 |
| 4,212,234 | A * | 7/1980 | DeCourcy | 99/426 |
| 6,220,152 | B1 * | 4/2001 | Baldwin et al. | 99/427 |
| 7,931,461 | B2 * | 4/2011 | van der Eerden et al. | 425/363 |
| 2006/0175527 | A1 * | 8/2006 | Morgan | 249/139 |

* cited by examiner

*Primary Examiner* — Jianying Atkisson
(74) *Attorney, Agent, or Firm* — Acker Wood IP Law, LLC; Gwen R. Acker Wood

(57) ABSTRACT

The present invention provides a device and method for simulating cooking stuffing in a bird, such as a turkey. Stuffing prepared with the device and method of the invention has both the appearance and taste of cooked-in-the-bird stuffing. In addition, the device and method of the invention allows the user to prepare simulated cooked-in-the-bird stuffing at any time, in any quantity and in less time compared to the several hours usually needed to cook stuffing in a bird. The invention, therefore, provides all the benefits of cooked-in-the-bird stuffing without the safety concerns of bacterial contamination when cooked in a bird.

10 Claims, 2 Drawing Sheets

DEVICE AND METHOD TO SIMULATE COOKING STUFFING IN A BIRD

CROSS REFERENCE TO RELATED APPLICATIONS

This application is a divisional of U.S. application Ser. No. 13/595,040, filed Aug. 27, 2012, which is incorporated herein by reference.

FIELD OF THE INVENTION

The present invention relates to devices and methods for cooking food and, in particular, to a device and method to cook stuffing which simulates cooking the stuffing in a bird.

BACKGROUND OF THE INVENTION

Cooking stuffing in a bird, such as a turkey, can be unsafe due to potential salmonella contamination, as juices from the bird tend to soak into the stuffing. To be considered safe to eat, the stuffing should be cooked to an internal temperature of at least 165° F. The time it takes for the center of the stuffing to reach this temperature typically results in over cooking the bird itself. Usually, however, the bird is cooked until it is done rather than when the stuffing reaches 165° F. Even with the knowledge that stuffing may not be fully cooked, many people still prefer cooking stuffing in a bird.

With no device available for simulating cooking stuffing in a bird, those who prefer stuffing cooked in a bird have no real alternative to prepare such a stuffing, unless they are cooking a bird. Traditional stove top stuffing is one way, but it does not compare in taste, consistency, or moisture of stuffing cooked in a bird, and it is often "loose" stuffing rather than the typical "log" stuffing that is achieved in a bird, which can be removed in sections and then sliced.

For large gatherings, such as Thanksgiving dinner, many people's favorite part of the dinner is stuffing, but usually there is not enough stuffing cooked in a traditional turkey due to the size restrictions of the bird's cavity. Cooking an additional turkey in order to get the desired amount of stuffing is not practical or cost-effective and results in having an excessive amount of poultry. Until now, there has not been a satisfactory way to simulate cooking stuffing in a bird, and thus, in-the-bird stuffing lovers have had no other option. There exists a need, therefore, for a device and method to prepare stuffing without a bird that simulates stuffing cooked in a bird that is as good as, or even better, than cooked-in-a-bird stuffing.

SUMMARY OF THE INVENTION

The present invention fulfills this need by providing a device and method for simulating cooking stuffing in a bird. The device comprises an external tube, an external cap, an internal tube and an internal cap. The external tube is configured to simulate a bird and the internal tube is configured to simulate a bird's cavity. The external tube has an outer surface, an inner surface, a first end, and a second end. The second end has an opening defining an interior space in the external tube. The opening has a lip thereon. The opening of the external tube may be sealed with the external cap which fits over the opening of the external tube. The external tube is configured to accept a liquid and, optionally, other foodstuffs therein, which the lip contains within the external tube. The internal tube has an outer surface, an upper surface, a lower surface, a first end, and a second end. The second end has an opening defining an interior space in the internal tube. The outer surface of the internal tube has a plurality of openings defining a plurality of holes therein, and a plurality of support braces thereon. The opening of the internal tube may be sealed with the internal cap which fits on the opening. The internal cap also has a plurality of holes therein and a plurality of support braces thereon. The internal tube is configured to accept a food stuffing. The diameter of the external tube is larger than the internal tube to allow placement of the internal tube within the interior space of the external tube.

The present invention also provides a method of simulating cooking stuffing in a bird using the device described above. The method comprises placing a quantity of stuffing into the internal tube, sealing the interior space of the internal tube with the interior cap, optionally placing one or more pieces of poultry between the plurality of support braces located on the upper surface of the internal tube, placing the internal tube into the interior space of the external tube, adding a liquid and optionally other food ingredients into the interior space of the external tube, sealing the interior space of the external tube with the external cap, and cooking the stuffing at a certain temperature for a certain period of time.

In accordance with the device and method of the invention, when the liquid in the external tube is heated to form a steam, the steam enters the interior space of the internal tube containing the stuffing through the plurality of holes in the internal tube.

BRIEF DESCRIPTION OF THE DRAWINGS

A fuller understanding of the invention can be gained from the following description when read in conjunction with the accompanying drawings in which.

DETAILED DESCRIPTION OF THE INVENTION

As defined herein, the term "food stuffing" and "stuffing" are meant to be interchangeable, and refer to a substance typically placed in a bird, such as a turkey, in which the substance consists of food ingredients that may include, for example and without limitation, poultry, meat, bread crumbs or cubes, dried bread, onion, celery, butter, eggs, salt, pepper and other herbs and spices.

As used herein, the term "bird" is meant to refer to an edible bird, such as poultry, and includes, without limitation, turkey, chicken, hen, pheasant or quail.

As used herein, the term "cooked-in-a-bird stuffing" is meant to refer to stuffing cooked in an edible bird and is meant to be indistinguishable from stuffing cooked according to the device and method described below.

Figure 1:
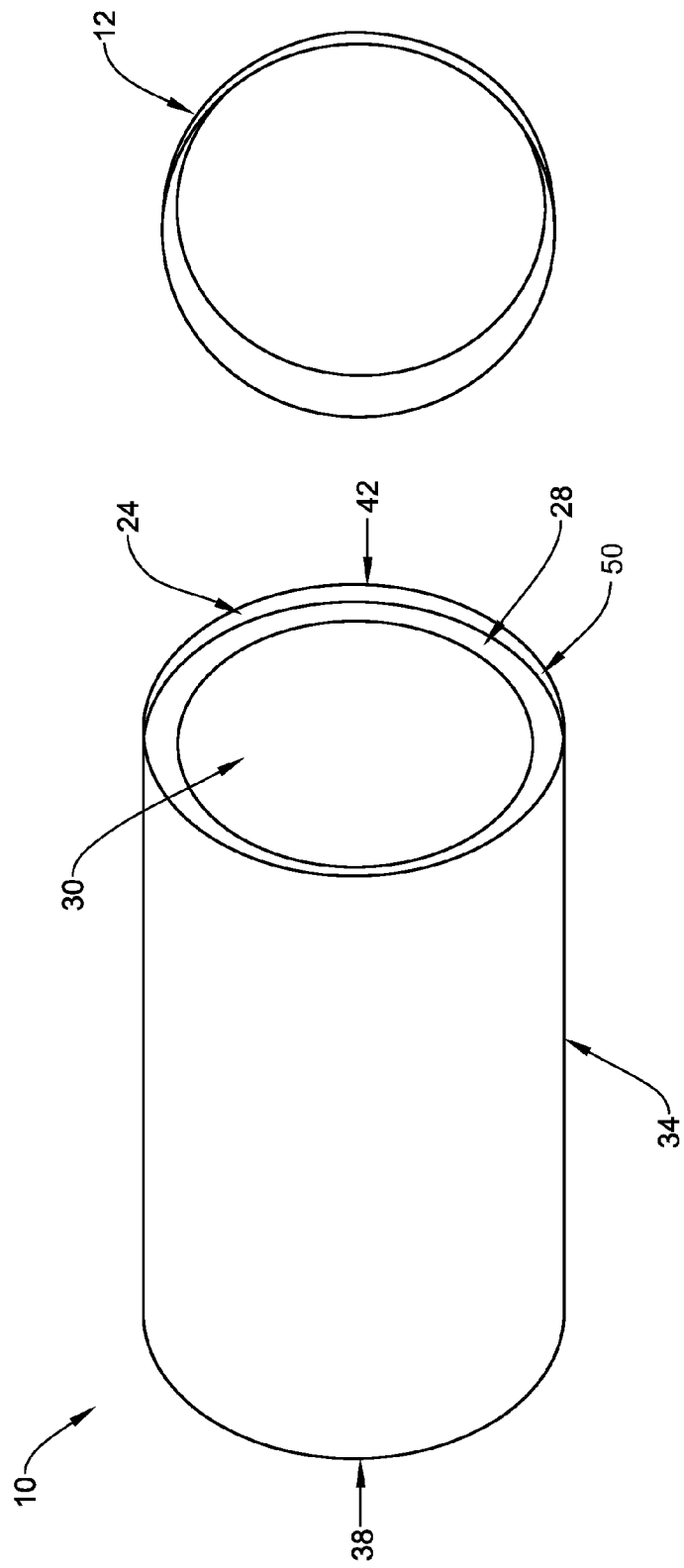
FIG. 1 shows the external tube and external cap in accordance with the invention.

Referring now to FIG. 1, the device in accordance with the invention is comprised of an external tube 10 having an outer surface 34, an inner surface 50, a first end 38, and a second end 42. The second end 42 has an opening 24 defining an interior space 30 of the external tube 10. The opening 24 has a lip 28 thereon. The external tube 10 is configured to accept a liquid and, optionally, other foodstuffs therein. The opening 24 of the external tube 10 may be sealed with an external cap 12 which fits over the opening 24 to seal the interior space 30 and any food ingredients contained in the external tube 10. In an embodiment, the external tube 10 has at least two small braces or legs (not shown) on the outer surface 34 to prevent lateral movement of the external tube 10 when in use.

In accordance with the invention, the external tube 10 has a length of about 4 inches to about 24 inches and a diameter of about 4 inches to about 16 inches. The lip 28 of the external tube 10 is about 0.5 inch to about 1.5 inches at its highest point and is located about 0.25 inch to about 1.0 inch from the opening 24 of the external tube 10. In an embodiment, the external tube 10 has a length of about 10 inches, a diameter of about 7 inches, and the lip 28 is about 1.0 inch at its highest point and located about 0.5 inch from the opening 24 of the external tube 10.

Figure 2:
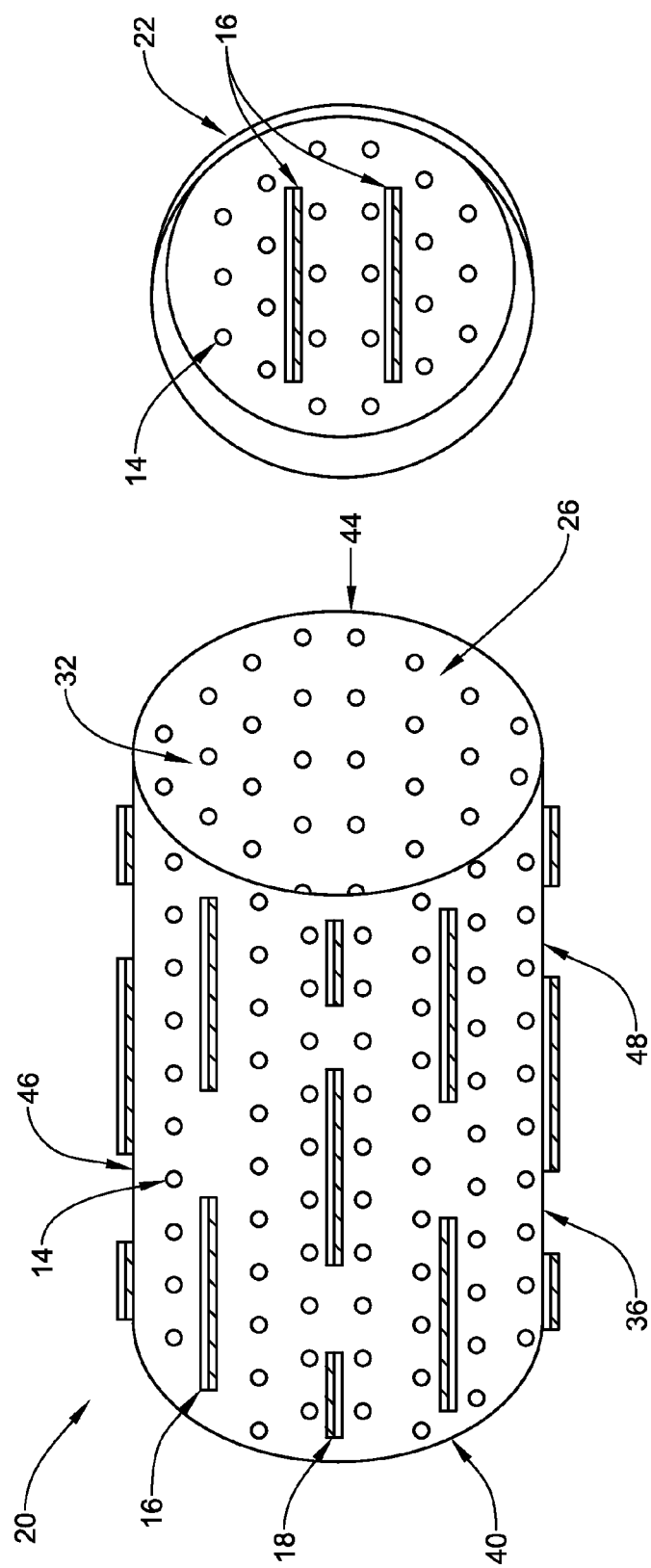
FIG. 2 shows the internal tube and the internal cap in accordance with the invention.

Referring now to FIG. 2, the internal tube 20 has an outer surface 36, an upper end 46, a lower end 48, a first end 40, and a second end 44. The second end 44 has an opening 26 defining an interior space 32 in the internal tube 20. The outer surface 36 of the internal tube 20 has a plurality of openings defining a plurality of holes 14 therein, and a plurality of support braces thereon. The plurality of support braces are comprised of a plurality of large support braces 16 and a plurality of small support braces 18 thereon. The opening 26 of the internal tube 20 is sealed with an internal cap 22 which fits on the opening 26. The internal cap 22 has a plurality of holes 14 therein and a plurality of large support braces 16 thereon. The internal tube 20 is configured to accept a food stuffing.

In accordance with the invention, the internal tube 20 has a length of about 3.0 inches to about 22.0 inches and a diameter of about 3.0 inches to about 14.0 inches. In an embodiment, the internal tube 20 has a length of about 8.0 inches and a diameter of about 5.0 inches. The plurality of large support braces 16 has a length of about 1.0 inch to about 5.0 inches, and the plurality of small braces 18 has a length of about 0.25 inch to about 1.5 inches. In an embodiment, the plurality of large support braces 16 has a length of about 3.0 inches, and the plurality of small braces 18 has a length of about 1.0 inch. The plurality of large braces 16 and small braces 18 have a thickness of about 0.25 inch to about 1.5 inches in order to prevent contact of the outer surface 36 of the internal tube 20 with the inner surface 50 of the external tube 10. In an embodiment, the plurality of large braces 16 and small braces 18 have a thickness of about 0.5 inch. The diameter of the plurality of holes 14 is about 0.1 inch to about 0.25 inch and spaced about 0.75 inch to about 1.25 inches apart from one another. In an embodiment, the diameter of the plurality of holes 14 is about 0.15 inch and spaced about 1.0 inch apart from one another. The plurality of the large and small braces 16, 18 are positioned between the plurality of holes 14 in a staggered, brick-like pattern and are about 1.25 inches to about 3.5 inches apart from one another. In an embodiment, the plurality of the large and small braces 16, 18 are about 1.5 inches apart from one another. The plurality of large braces 16 and small braces 18 on the upper end 46 of the internal tube 20 are configured to allow a user to optionally place pieces of a bird thereon.

Referring to both FIGS. 1 and 2, in accordance with the invention, the diameter of the external tube 10 is larger than the internal tube 20 to allow placement of the internal tube 20 within the interior space 30 of the external tube 10. Stuffing may be placed in the interior 32 space of the internal tube 20 and a liquid may be placed in the interior space 30 of the external tube 10. Suitable food ingredients that may be placed in the interior space 30 of the external tube include, without limitation, herbs, spices, pieces of poultry or other suitable food ingredients.

In accordance with the invention, the shapes of the external tube and the internal tube are substantially the same, and include, without limitation, shapes such as circular, ovoid, square, rectangular or triangular.

Suitable materials in which the external tube and the internal tube of the invention may be fabricated include, without limitation, metal, plastic, silicone or combinations thereof.

The present invention also provides a method of simulating cooking stuffing in a bird using the device described above. The method comprises placing a quantity of stuffing into the internal tube, sealing the interior space of the internal tube with the interior cap, optionally placing one or more pieces of poultry between the plurality of support braces located on the upper end of the internal tube, placing the internal tube into the interior space of the external tube, adding a liquid and optionally other food ingredients into the interior space of the external tube, sealing the interior space of the external tube with the external cap which fits over the opening of the external tube, and cooking the stuffing at a certain temperature for a certain period of time.

Cooking the stuffing in the device and method in accordance with the invention may be accomplished in a cooking mode such as, without limitation, an oven, a stove-top, a microwave or using a combination of modes.

In an embodiment, cooking is done in an oven at a temperature of about 325° F. for about 1 hour. In another embodiment, cooking is done in an oven at a temperature of about 350° F. for about 45 minutes. In either case, the time needed to cook stuffing using the device and method of the invention is considerably less than the time that would be needed to properly cook stuffing in a bird, which typically takes about 3-6 hours.

Stuffing cooked in accordance with the device and method of the invention will have the appearance of a "log," which holds its shape and may be sliced the same way as cooked-in-the-bird stuffing. Alternatively, the stuffing may be prepared as a looser-style stuffing.

The device and method of the invention allows for a stuffing that remains moist and infused with flavors during the cooking process that is substantially the same as cooked-in-the-bird stuffing, rather than quickly drying out the way stuffing cooked out of a bird typically does. As liquid heats up in the external tube, steam is created which infuses flavored steam through the holes in the external tube and into the internal tube to flavor and texturize the stuffing therein. In addition, the whole process is much faster than stuffing cooked in a bird and without the concern of salmonella contamination. Thus, stuffing made in accordance with the device and method of the invention has both the appearance and taste of cooked-in-the-bird stuffing; and allows the user to prepare simulated cooked-in-the-bird stuffing at any time, in any quantity and in less time compared to stuffing cooked in a bird. The invention, therefore, provides all the benefits of cooked-in-the-bird stuffing but in less time and without the safety concerns of bacterial contamination.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

What is claimed is:

1. A device for simulating cooking stuffing in a bird, comprising:
   an external tube having an outer surface, an inner surface, a first end and a second end, said second end having an opening defining an interior space in the external tube, said interior space configured to accept a liquid and food ingredients therein, said opening having a lip thereon, wherein the external tube has a plurality of support braces on the outer surface to prevent movement;
an external cap which fits over the opening of the external tube which seals the interior space of the external tube;
an internal tube having an outer surface, an upper end, a lower end, a first end, and a second end, said second end having an opening defining an interior space of the internal tube, said outer surface of the internal tube having a plurality of holes therein and having at least twenty or more support braces thereon, wherein the internal tube is configured to accept a quantity of stuffing in the interior space;
an internal cap which fits on the opening of the internal tube to seal the opening of the internal tube, said internal cap having a plurality of holes therein and a plurality of support braces thereon, wherein the at least twenty or more support braces are positioned between the plurality of holes in a staggered, brick-like pattern and wherein the ratio of holes to support braces on the outer surface of the internal tube and on the at least one internal cap is about 10:1, wherein the diameter of the external tube is larger than the diameter of the internal tube to allow placement of the internal tube within the interior space of the external tube, wherein the external tube is analogous to a bird's body and the internal tube is analogous to a cavity contained within the bird's body, wherein heating the liquid in the external tube creates steam which enters the interior space of the internal tube through the plurality of holes in the internal tube.

2. The device of claim 1, wherein the external tube is circular in shape and has a length of about 10.0 inches and a diameter of about 7.0 inches, wherein the internal tube is circular in shape and has a length of about 8.0 inches and a diameter of about 5.0 inches, and wherein the lip is about 1.0 inch at its highest point and is located about 0.5 inch from the opening of the external tube.

3. The device of claim 1, wherein the at least twenty support braces are comprised of a combination of large support braces and small support braces, said large braces having a length of about 1.0 inch to about 5.0 inches, said small braces having a length of about 0.25 inch to about 1.5 inches, wherein are about 1.25 inches to about 3.5 inches apart from one another, wherein the combination of at least twenty large braces and small braces have a thickness of about 0.25 inch to about 1.5 inches so as to prevent contact of the outer surface of the internal tube with the internal surface of the external tube, and wherein the diameter of the plurality of holes are about 0.1 inch to about 0.25 inch and spaced about 0.75 inch to about 1.25 inches apart from one another.

4. The device of claim 3, wherein said large braces has a length of about 3.0 inches, said small braces has a length of about 1.0 inch, wherein the at least twenty large and small braces are positioned about 1.5 inches apart from one another, wherein the combination of the at least twenty large braces and small braces have a thickness of about 0.5 inch, and wherein the diameter of the plurality of holes are about 0.15 inch and spaced about 1.0 inch apart from one another.

5. The device of claim 1, wherein the food ingredients are selected from the group consisting of herbs, spices and other food ingredients.

6. The device of claim 1, wherein the stuffing is cooked in the device at a certain temperature for a certain period of time, said cooking mode selected from the group consisting of an oven, a stove-top, a microwave and combinations thereof.

7. The device of claim 6, wherein the cooking is done in an oven at a temperature of about 325° F. for about 1 hour.

8. The device of claim 6, wherein the cooking is done in an oven at a temperature of about 350° F. for about 45 minutes.

9. The device of claim 1, wherein the external tube and the internal tube are made of materials selected from the group consisting of metal, plastic, silicone and combinations thereof.

10. The device of claim 1, wherein the bird is a poultry bird selected from the group consisting of turkey, chicken, pheasant and quail.

\* \* \* \* \*